United States Patent [19]
Langsdorf et al.

[11] Patent Number: 6,155,431
[45] Date of Patent: Dec. 5, 2000

[54] FILTER ASSEMBLY

[75] Inventors: Brian J. Langsdorf, Perrysburg; Christopher Reamsnyder, Ottawa; Richard R. Berkey, Toledo, all of Ohio

[73] Assignee: Honeywell International Inc., Morristown, N.J.

[21] Appl. No.: 09/304,147

[22] Filed: May 3, 1999

[51] Int. Cl.$^7$ .................................................... B01D 35/02
[52] U.S. Cl. .................................... 210/443; 210/DIG. 17
[58] Field of Search ................................... 210/440, 441, 210/443, 444, 445, 451, 455, 232, 238, 497.01, 450, DIG. 17; 55/502, 495, 496

[56] References Cited

U.S. PATENT DOCUMENTS

| | | |
|---|---|---|
| 3,256,989 | 6/1966 | Hultgren . |
| 3,411,632 | 11/1968 | Offer et al. . |
| 3,616,933 | 11/1971 | Baldwin . |
| 4,369,113 | 1/1983 | Stifelman . |
| 4,834,885 | 5/1989 | Misgen et al. . |
| 4,969,994 | 11/1990 | Misgen et al. . |
| 5,209,845 | 5/1993 | Sims . |
| 5,490,930 | 2/1996 | Krull . |
| 5,525,226 | 6/1996 | Brown et al. . |
| 6,019,229 | 2/2000 | Rao . |

*Primary Examiner*—W. L. Walker
*Assistant Examiner*—David Sorkin

[57] ABSTRACT

A filter assembly is provided having a housing defining a housing edge. A tapping plate is also provided and is generally circular in shape. The tapping plate defines a tapping plate edge and includes a fluid inlet port and a fluid outlet port. Preferably, the at least one fluid outlet port is a central threaded aperture to enable the filter assembly to be secured to a filter mount of an engine. An interconnecting device is included for interconnecting the housing and the tapping plate. The interconnecting device further retains an external seal generally about the tapping plate edge. The external seal is an economically formed lathe-cut gasket and the interconnecting device includes a first and second extension member. The first extension member is formed integrally with the tapping plate at the tapping plate edge. The second extension member is formed integrally with the housing at the housing edge. The second extension member extends substantially around the first extension member, thereby providing a seamless interconnection and a generally flat surface for retaining the lathe-cut gasket. Alternatively, the interconnecting device includes a seal support tray. The seal support tray is generally U-shaped and includes opposing first and second legs. The first and second legs are positioned adjacent the lathe-cut gasket. The second extension member extends substantially around the first extension member and the first leg of the seal support tray, thereby providing an interconnection impervious to fluid leakage.

10 Claims, 2 Drawing Sheets

FILTER ASSEMBLY

CROSS-REFERENCE TO RELATED APPLICATIONS

This application is related to concurrently filed U.S. patent application Ser. No. 09/304,146 entitled "JSEAM TAPPING PLATE WITH GASKET GROOVE FOR SPIN-ON FILTER ASSEMBLIES" and U.S. patent application Ser. No. 09/316,578 entitled "WING TAPPING PLATE FOR SPIN-ON FILTER ASSEMBLIES," which disclose common subject matter.

FIELD OF THE INVENTION

The present invention relates to a spin-on fluid filter and, more particularly, to a spin-on fluid filter having a roll-formed body mating with a tapping plate for use with a lathe-cut gasket.

BACKGROUND OF THE INVENTION

Fluid filters are commonly used in engine lubrication systems, hydraulic systems, and fuel systems to remove solid materials, such as dirt and abrasives, from the fluid being circulated. Traditionally, fluid filters include a filtering member or element disposed within a main body, casing, or housing. A tapping plate or cover is fastened to the main body to enclose the filtering member. The tapping plate includes a plurality of openings to enable fluid flow through the filtering member. The fluid flow may be either directed into the filter through a central opening in the tapping plate or through a plurality of circumferential openings disposed radially about the tapping plate. The fluid filter is typically mounted to the engine or hydraulic system by spinning the tapping plate onto a filter mount extending from the engine or hydraulic system. This type of mounting method is commonly known as a spin-on type.

A uniquely shaped primary sealing element or gasket traditionally extends from the exterior of the tapping plate to seal a volume between the tapping plate and the filter mount. Depending on the specific design of the engine or hydraulic system, the sealing element may be positioned in either an inboard position or an outboard position relative to the main body diameter. The unique shapes of these specialized gaskets are used to enable the gaskets to be more readily secured to the tapping plate. Uniquely formed gaskets, such as those shown in U.S. Pat. Nos. 4,834,885 and 4,969,994, have the distinct disadvantage of requiring special manufacturing techniques to produce. These special manufacturing techniques almost inherently require added costs.

Alternatively, die casted tapping plates are occasionally used. These die casted tapping plates normally include specialized seal retaining means for retaining lathe-cut gaskets. Lathe-cut gaskets are more readily and economically produced relative to the specialized gasket described above. However, die casted tapping plates are generally more expensive to tool and manfacture relative to stamp-formed tapping plates. Some prior art designs have attempted to combine a stamp-formed cover with a steel baseplate to be used as a tapping plate assembly. The gasket is retained in the cover and the cover is welded to the baseplate for added rigidity. An example of this combination design is shown in U.S. Pat. No. 5,490,930. However, it should be appreciated that this design requires additional parts and processing steps, which inherently increases the cost of manufacturing.

A second seal is commonly used to prevent fluid flow between the tapping plate and the main body. An example of this second seal design is shown in U.S. Pat. No. 4,369,113. The second seal is typically secured in place by a series of metal folds or double-rolls formed in the main body and the tapping plate. Although this arrangement appears to be temporarily effective, it may not afford maximum leakage protection during severe operating conditions. Specifically, it is believed that the two-seal design may fail to prevent fluid leakage when exposed to hydrostatic pressure or hydrodynamic impulses. Such severe operating conditions commonly occur in industrial or heavy-equipment applications, but may also occur in passenger car applications.

Metal folds are also commonly used for joining and sealing the main body to the tapping plate. More particularly, a free end of the tapping plate is rolled or crimped together with a free end of the main body. The combination is typically rolled twice and crimped to form a bead around the edge of the filter assembly. Although this method also appears to be temporarily effective, it is not believed to afford maximum leakage protection during severe conditions. Similar to the two-seal design, the double-rolled bead may fail to prevent fluid leakage when exposed to hydrostatic pressure or hydrodynamic impulses. Moreover, the double-rolled seam is relatively expensive to manufacture and may require seam assembly control and/or additional sealing compounds to produce a reliable interconnection, as variations in seam integrity and welding may occur. Sealing compounds are typically applied during manufacturing to limit fluid leakage through the main body and tapping plate interconnection.

Accordingly, there exists a need in the relevant art to provide a fluid filter capable of maximizing the sealing effect between the main body and the tapping plate without the use of a second seal positioned therebetween. Furthermore, there exists a need in the relevant art to provide a fluid filter capable of effectively retaining a main sealing element. Still further, there exists a need in the relevant art to provide a fluid filter capable of using an economical lathe-cut gasket as the primary sealing means.

SUMMARY OF THE INVENTION

In accordance with the broad teachings of this invention, a fluid filter having an advantageous construction is provided.

It is an object of the present invention to provide a fluid filter capable of preventing fluid leakage between the main body and the tapping plate, without the use of a second seal positioned therebetween. It is also an object of the present invention to provide a unique method of retaining a lathe-cut gasket about the peripheral surface of the filter.

According to a first preferred embodiment of the present invention, a filter assembly is provided having a housing. The housing is generally cylindrical and defines a housing edge. A filtering element is disposed in the housing for filtering a fluid flowing therethrough. A tapping plate is also provided and is generally circular in shape. The tapping plate defines a tapping plate edge and includes a fluid inlet port and a fluid outlet port. Preferably, the fluid outlet port is a central threaded aperture to enable the filter assembly to be secured to a filter mount. An interconnecting device is included for interconnecting the housing and the tapping plate. The interconnecting device retains an external seal generally about the tapping plate edge.

According to a more preferred embodiment, the external seal is an economically formed lathe-cut gasket and the interconnecting device includes a first and second extension. The first extension is formed integrally with the tapping plate at the tapping plate edge. The second extension is formed integrally with the housing at the housing edge. The first extension extends substantially around the second extension, thereby providing a seamless interconnection and a generally flat surface for retaining the lathe-cut gasket.

According to an alternative embodiment of the present invention, the external seal is an economically formed lathe-cut gasket and the interconnecting device includes a first extension, a second extension, and a seal support tray. The first extension is formed integrally with the tapping plate at the tapping plate edge. The second extension is formed integrally with the housing at the housing edge. The seal support tray is generally U-shaped and includes opposing first and second legs. The first and second legs are positioned adjacent the lathe-cut gasket. The first extension extends substantially around the second extension and the first leg of the seal support tray, thereby providing an interconnection impervious to fluid leakage.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. For example, the sealing configuration of the present invention may find utility in various filter applications, such as, but not limited to, those used in lubrication systems, hydraulic systems, and fuel systems.

Figure 1:
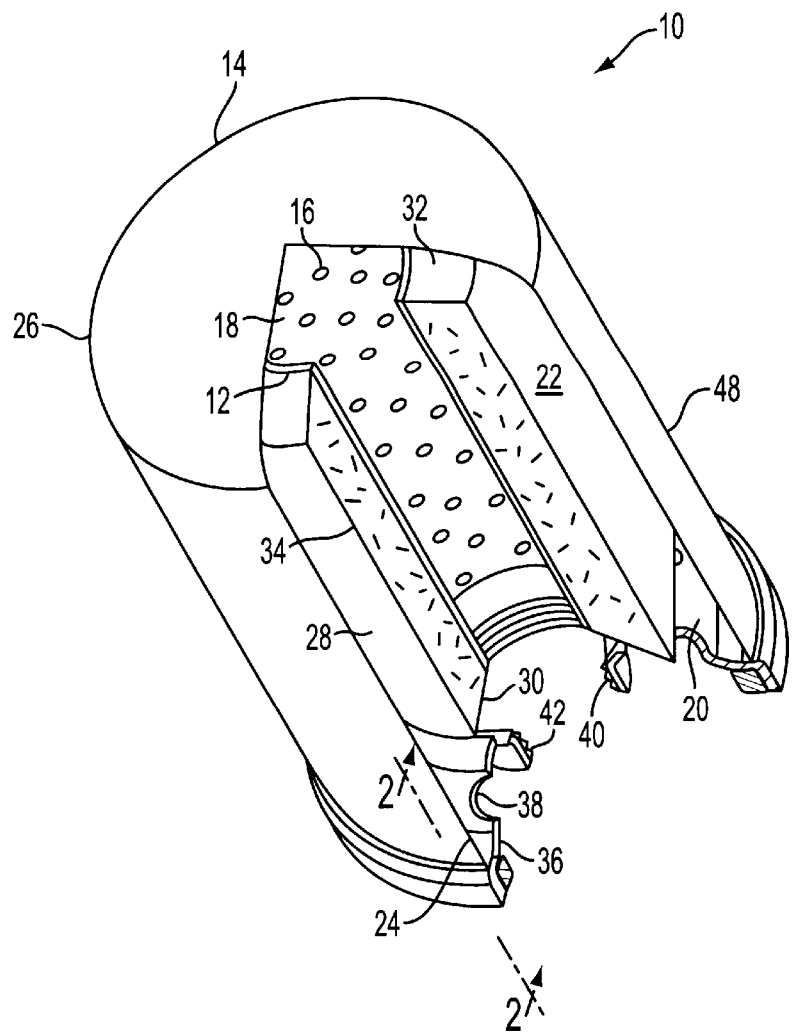
FIG. 1 is a bottom perspective view, with portions in cross-section, of a filter assembly having an improved single-piece-sealing configuration according to a first embodiment of the present invention.
Figure 2:
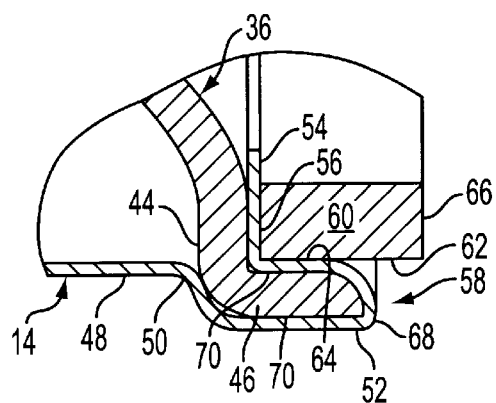
FIG. 2 is a partial cross-sectional view taken along line 2—2 of FIG. 1.

Referring to FIGS. 1 and 2, a filtering device or assembly 10 is shown according to a first embodiment of the present invention. Filtering assembly 10 is adapted to be mounted to a filter mount (not shown) of an engine. Specifically, filtering assembly 10 is adapted to be operably mounted to and in communication with a lubrication system, hydraulic system, fuel system, or other fluid circulation system, which benefits from fluid filtration.

Filtering assembly 10 includes a generally cylindrical sleeve or barrier 12 disposed within a housing, casing, or support structure 14. Cylindrical sleeve 12 includes a plurality of apertures 16 formed therethrough. A first volume 18 is defined by the interior of cylindrical sleeve 12. A second volume 20 is defined by the exterior of cylindrical sleeve 12 and the interior of housing 14. Apertures 16 of cylindrical sleeve 12 enable filtered fluid to flow from second volume 20 to first volume 18, or vice versa.

Filtering assembly 10 further includes a porous filtering element or member 22 for removing solid materials, such as dirt and abrasives, from the fluid being circulated. Filtering member 22 is disposed in second volume 20 adjacent cylindrical sleeve 12 and extends generally from a top portion 24 of housing 14 to a bottom portion 26 of housing 14. Filtering member 22 is preferably cylindrically shaped having an outer diameter less than the inner diameter of housing 14 and an inner diameter substantially equal to an outer diameter of cylindrical sleeve 12. This arrangement thereby defines a fluid channel 28 extending around a top portion 30, a bottom portion 32, and an outer diameter 34 of filtering member 22.

As best seen in FIG. 1, a tapping or cover plate 36 is coupled to top portion 24 of housing 14. The interconnection between tapping plate 36 and housing 14 will be described in detail below. Tapping plate 36 includes a plurality of fluid inlet ports 38 positioned adjacent a central threaded aperture 40. Fluid inlet ports 38 are in fluid communication with second volume 20 and, thus, are adapted to introduce and permit a fluid, such as engine oil, to flow through filtering member 22. Central threaded aperture 40 of tapping plate 28 is adapted to engage a typical filter mount (not shown) of an engine. As is known in the art, filter mounts generally include a generally flat surface adapted to receive a seal and a central threaded stud adapted to engage and retain a threaded aperture of a filter.

Central threaded aperture 40 of tapping plate 28 defines a fluid outlet port 42. Fluid outlet port 42 is in fluid communication with first volume 18 and, thus, is adapted to permit filtered fluid from filtering member 22 to flow out fluid outlet port 42. Consequently, a fluid path extends from fluid inlet ports 38 and fluid channel 28 through filtering member 22 and the plurality of apertures 16 of cylindrical sleeve 12 to fluid outlet port 42.

The interconnection between tapping plate 36 and housing 14 will now be described in detail. As best seen in FIG. 2, tapping plate 36 is generally a concave circularly shaped member having, as described above, a plurality of fluid inlet ports 38 positioned adjacent central threaded aperture 40. Referring now to FIG. 2, tapping plate 36 further defines a tapping plate edge 44 extending around the periphery of tapping plate 36. A first extension member 46 is formed integrally with tapping plate 36 to form an upturned protrusion extending from tapping plate edge 44. An outer diameter of first extension member 46 is preferably greater than an outer diameter of a main portion 48 of housing 14. Similar to tapping plate 36, housing 14 further defines a housing edge 50 extending around top portion 24. A second extension member 52 is formed integrally with housing 14 and extending from housing edge 50.

To effect a seamless interconnection and reliable seal between tapping plate 36 and housing 14, second extension member 52 of housing 14 is folded using mechanical means substantially around first extension member 46 of tapping plate 36. A free end 54 of second extension member 52 is then folded generally perpendicular to a longitudinal axis of filtering assembly 10. Such folding of free end 54 thereby defines a generally flat surface 56. Such folding of second extension member 52 about first extension member 46 produces an interconnecting device 58 having a J-shaped profile. It should be appreciated that a sealing compound 70 may be disposed between first extension member 46 of tapping plate 36 and second extension member 52 of housing 14 to provide a rigid bond therebetween for improving sealing and torque removal.

A seal 60 is further provided for minimizing fluid leakage between tapping plate 36 and the filter mount (not shown) of the engine. Preferably, seal 60 is a lathe-cut gasket having a generally rectangular cross-section and is positioned at an outboard location adjacent tapping plate edge 46. An outer diameter 62 of seal 60 is preferably press-fit against an inner diameter 64 of interconnecting device 58 such that a sealing portion 66 of seal 60 extends beyond a top portion 68 of interconnecting device 58. It should be appreciated that sealing portion 66 of seal 60 may extend any distance beyond top portion 68 of interconnecting device 58, which is conducive to minimizing fluid leakage in a particular application.

Figure 3:
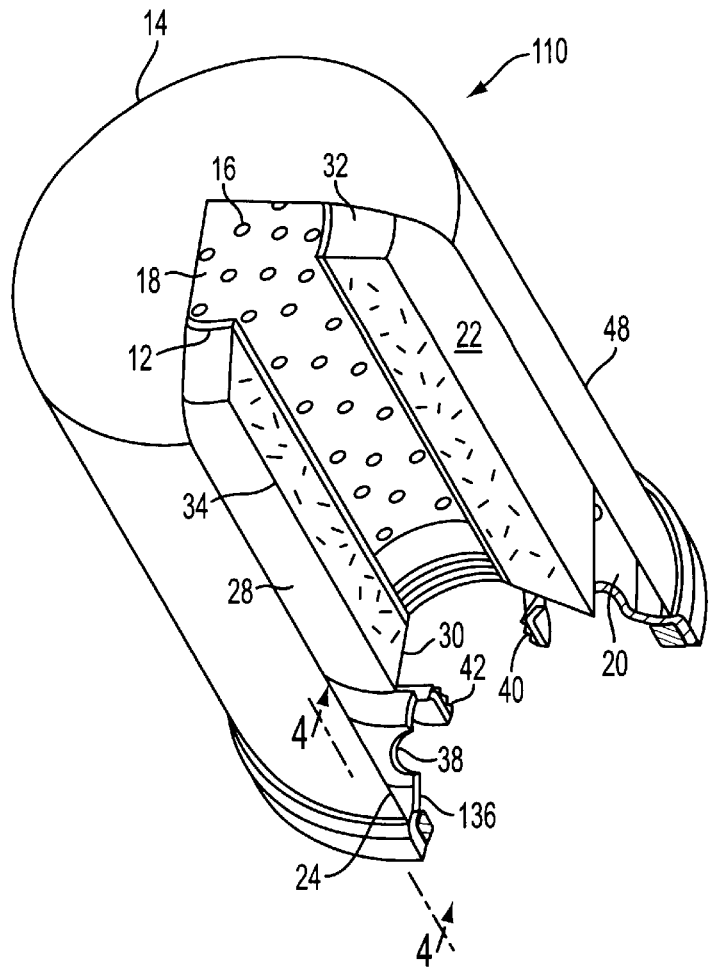
FIG. 3 is a bottom perspective view, with portions in cross-section, of a filter assembly having an improved two-piece sealing configuration according to a second embodiment of the present invention.
Figure 4:
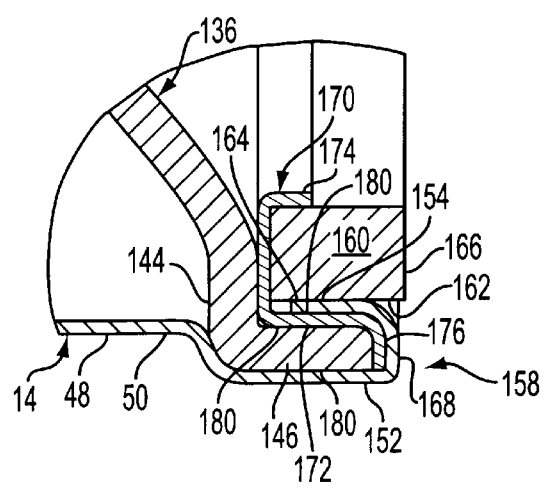
FIG. 4 is a partial cross-sectional view taken along line 4—4 of FIG. 3.

Referring to FIGS. 3 and 4, a filtering device or assembly 110 is shown according to a second embodiment of the present invention. Filtering assembly 110 is adapted to be mounted to a filter mounted (not shown) of an engine, similar to filtering assembly 10. It should be appreciated that like reference numerals between FIGS. 1–2 and 3–4 indicate like parts.

The interconnection between tapping plate 136 and housing 14 according to the second embodiment will now be described in detail. Tapping plate 136 is generally a concave, circularly shaped member having, as described above, the plurality of fluid inlet ports 38 positioned adjacent central threaded aperture 40. Tapping plate 136 further defines a tapping plate edge 144 extending around the periphery of tapping plate 136. A first extension member 146 is formed integrally with tapping plate 136 to form an upturned protrusion extending from tapping plate edge 144. An outer diameter of first extension member 146 is preferably greater than the outer diameter of main portion 48 of housing 14. Similar to tapping plate 136, housing 14 further defines a housing edge 50 extending around top portion 24. A second extension member 152 is formed integrally with housing 14 and extends from housing edge 50. A seal support tray 170 is further provided being generally U-shaped. More particularly, seal support tray 170 includes first and second upturned legs 172, 174, respectively. First upturned leg 172 further includes an outwardly turned tab 176.

To effect a seamless interconnection and reliable seal between tapping plate 136 and housing 14, second extension member 152 of housing 14 is folded using mechanical means substantially around first extension member 146 of tapping plate 136. Seal support tray 170 is positioned inwardly from and adjacent to first extension member 146 such that tab 176 of first upturned leg 172 extends over an end of first extension member 146. A free end 154 of second extension member 152 is then folded such that it generally encloses first extension member 146 and first upturned leg 172 and terminates at a position adjacent first extension member 146. Such folding of second extension member 152 about first extension member 146 and first upturned leg 172 of seal support tray 170 produces an interconnecting device 158 having a J-shaped profile. Interconnecting device 158 is generally impervious to fluid leakage caused by hydrostatic pressure and hydrodynamic impulses. It should be appreciated that a sealing compound 180 may be disposed between first upturned leg 172 of seal support tray 170 and free end 154 of second extension member 152 and/or between first extension member 146 and second extension member 152 to provide a rigid bond therebetween for improved sealing and torque removal.

A seal 160 is further provided for minimizing fluid leakage between tapping plate 136 and the filter mount (not shown) of the engine. Preferably, seal 160 is a lathe-cut gasket having a generally rectangular cross-section. An outer diameter 162 of seal 160 is preferably press-fit against an inner diameter 164 of interconnecting device 158 such that a sealing portion 166 of seal 160 extends beyond a top portion 168 of interconnecting device 158. It should be appreciated that sealing portion 166 of seal 160 may extend any distance beyond top portion 168 of interconnecting device 158, which is conducive to minimizing fluid leakage in a particular application. Second upturned leg 174 of seal support tray 170 provides means for locating seal 160 in seal support tray 170 for added ease of installation, improved gasket retention, and lower cost.

The filter assembly of the present invention is advantageous over conventional filter assemblies in that the present invention permits the use of lathe-cut gaskets as the primary sealing means. Lathe-cut gaskets are typically more cost effective to manufacture than uniquely shaped gaskets frequently used in conventional filter assemblies. Furthermore, the lathe-cut gasket design is believed to provide an improved sealing surface between the gasket and the filter mount. Additionally, the filter assembly of the present invention minimizes fluid leakage between the filter housing and the tapping plate by extending the second extension member of the housing substantially around the first extension member of the tapping plate. Such an arrangement is believed to provide a seamless interconnection, which unlike conventional filter assemblies is impervious to fluid leakage and capable of withstanding severe operating conditions, such as hydrostatic pressure and hydrodynamic impulses. Moreover, the filter assembly of the present invention eliminates the need to use a series of metal folds or double-rolls, which is expensive to manufacture.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A filter assembly for use in a fluid circulation system, said filter assembly comprising:

a generally cylindrical housing defining a housing edge;

a filtering element disposed in said housing for filtering a fluid;

a tapping plate being generally circular and defining a tapping plate edge, said tapping plate further having a fluid inlet port, a fluid outlet port, and mounting means for removably mounting the filter assembly to the fluid circulation system disposed therein;

an external seal having a generally rectangular cross-section; and an interconnecting device for interconnecting said housing with said tapping plate for retaining said external seal generally about said tapping plate edge, said interconnecting device including:

a first extension formed integrally with said tapping plate, said first extension being positioned adjacent said tapping plate edge;

a second extension formed integrally with said housing, said second extension being positioned adjacent said housing edge; and a seal support tray being generally U-shaped having opposing first and second legs, said first and second legs being positioned adjacent to a base potion of said seal, said first extension being Positioned radially outwardly of said first and second legs, said seal being positioned between said first and second legs, and said second extension terminating between said first and second legs;

wherein said second extension extends substantially around said first extension and a portion of said seal support tray, thereby providing an interconnection impervious to fluid leakage and a generally U-shaped surface for retaining said seal.

2. The filter assembly according to claim 1 wherein said external seal is a lathe-cut gasket.

3. The filter assembly according to claim 1, further comprising a sealing compound disposed between said second extension and said first leg of said seal support tray.

4. The filter assembly according to claim 1 wherein said mounting means includes a central apperture disposed in said tapping plate, said aperture surrounded by a threaded portion of said tapping plate and including said fluid outlet port.

5. A fluid filter for an engine, said engine having a filter mount, said fluid filter comprising:

a generally cylindrical casing defining a casing edge;

a filtering element disposed in said casing for filtering a fluid;

a cover plate being generally circular and defining a cover plate edge, said cover plate further having a central aperture surrounded by a threaded portion of said cover plate for engaging the filter mount of the engine and providing an outlet port for said fluid, said cover plate further including an inlet port for said fluid;

a seal for preventing fluid leakage between said cover plate and the filter mount of the engine; and an interconnecting device for interconnecting said casing with said cover plate for retaining said seal generally about said cover plate edge, said interconnecting device including:

a first extension formed integrally with said cover plate, said first extension being positioned adjacent said cover plate edge;

a second extension formed integrally with said casing, said second extension being positioned adjacent said casing edge; and a seal support tray being generally U-shaped having opposing first and second legs, said first and second legs being positioned adjacent to a base portion of said seal, said first extension being positioned radially outwardly of said first and second legs, said seal being positioned between said first and second legs, and said second extension terminating between said first and second legs;

wherein said second extension extends substantially around said first extension and a portion of said seal support tray, thereby providing an interconnection impervious to fluid leakage and a generally U-shaped surface for retaining said seal.

6. The fluid filter according to claim 5 wherein said seal is a lathe-cut gasket.

7. The fluid filter according to claim 5, further comprising a sealing compound disposed between said second extension and said first leg of said seal support tray.

8. An oil fluid filter for an engine, said engine having a filter mount, said oil filter comprising:

a generally cylindrical main body defining a main body edge;

a filtering element disposed in said main body for filtering a fluid;

a tapping plate being generally circular and defining a tapping plate edge, said tapping plate further having a central aperture surrounded by a threaded portion of said tapping plate for engaging the filter mount of the engine and providing an outlet port for the oil, said tapping plate further including an inlet port for the oil;

a seal for preventing oil leakage between said tapping plate and the filter mount of the engine; and an interconnecting device for interconnecting said main body with said tapping plate for retaining said seal generally about said tapping plate edge, said interconnecting device including:

a first extension formed integrally with said tapping plate, said first extension being position adjacent said tapping plate edge;

a second extension formed integrally with said main body, said second extension being positioned adjacent said main body edge; and a seal support tray being generally U-shaped having opposed first and second legs, said first and second legs being positioned adjacent to a base portion of said seal, said first extension being positioned radially outwardly of said first and second legs, said seal being positioned between said first and second legs, and said second extension terminating between said first and second legs;

wherein said second extension extends substantially around said first extension and a portion of said seal support tray, thereby providing an interconnection impervious to oil leakage and a generally U-shaped surface for retaining said seal.

9. The oil filter according to claim 8 wherein said seal is a lathe-cut gasket.

10. The oil filter according to claim 8, further comprising a sealing compound disposed between said second extension and said first leg of said seal support tray.

* * * * *